United States Patent
Kim et al.

(10) Patent No.: US 10,932,210 B2
(45) Date of Patent: Feb. 23, 2021

(54) CONTENT OUTPUT DEVICE AND CONTROL METHOD THEREOF

(71) Applicant: SAMSUNG ELECTRONICS CO., LTD., Suwon-si (KR)

(72) Inventors: Jung-su Kim, Suwon-si (KR); Sang-bum Sung, Yongin-si (KR); Jae-hoon Lee, Seoul (KR); Si-myung Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 15/794,091

(22) Filed: Oct. 26, 2017

(65) Prior Publication Data
US 2018/0124719 A1 May 3, 2018

(30) Foreign Application Priority Data

Oct. 28, 2016 (KR) .................. 10-2016-0142341

(51) Int. Cl.
*H04W 56/00* (2009.01)
*H04L 12/28* (2006.01)
(Continued)

(52) U.S. Cl.
CPC ......... *H04W 56/001* (2013.01); *H04L 12/282* (2013.01); *H04L 12/46* (2013.01);
(Continued)

(58) Field of Classification Search
None
See application file for complete search history.

(56) References Cited

U.S. PATENT DOCUMENTS 5,079,762 A * 1/1992 Tanabe ................ H04L 49/20
370/418
8,589,578 B2 11/2013 Gopalakrishnan et al.
(Continued)

FOREIGN PATENT DOCUMENTS

JP            5675757      2/2015
KR    10-2014-0090814    7/2014
(Continued)

OTHER PUBLICATIONS

Search Report and Written Opinion dated Dec. 26, 2017 in counterpart International Patent Application No. PCT/KR2017/011279.
(Continued)

*Primary Examiner* — Sai Aung
*Assistant Examiner* — Richard Schnell
(74) *Attorney, Agent, or Firm* — Nixon & Vanderhye P.C.

(57) ABSTRACT

A first content output device (e.g., speaker) may include a communication interface, an output unit, and a processor. The first content output device, upon receiving a request, selectively transmits audio content to an external content output device (e.g., speaker) via two different networks. While the external content device is buffering the audio content received from the first content device via a first network, the devices are setting up for connection via a different second network. When the setting for connection between the device via the second network is completed, the first content output device switches to transmitting the audio content to the external content output device via the second network.

20 Claims, 18 Drawing Sheets

(51) Int. Cl.
   *H04L 12/46* (2006.01)
   *H04L 12/863* (2013.01)
   *H04L 29/06* (2006.01)
   *H04L 29/08* (2006.01)
   *H04R 3/12* (2006.01)
   *H04W 84/12* (2009.01)
   *H04W 84/18* (2009.01)

(52) U.S. Cl.
   CPC ........ *H04L 47/6255* (2013.01); *H04L 65/607* (2013.01); *H04L 65/80* (2013.01); *H04L 67/1042* (2013.01); *H04R 3/12* (2013.01); *H04L 67/1044* (2013.01); *H04L 2012/2841* (2013.01); *H04L 2012/2849* (2013.01); *H04W 84/12* (2013.01); *H04W 84/18* (2013.01)

(56) References Cited

U.S. PATENT DOCUMENTS

| | | | |
|---|---|---|---|
| 8,799,749 | B2 | 8/2014 | Kwak et al. |
| 2007/0106829 | A1 | 5/2007 | Iwamura |
| 2008/0092204 | A1 | 4/2008 | Bryce et al. |
| 2008/0311852 | A1* | 12/2008 | Hansen ................. H04W 88/06 455/41.2 |
| 2009/0305694 | A1 | 12/2009 | Zheng et al. |
| 2011/0106965 | A1 | 5/2011 | Chun et al. |
| 2015/0195425 | A1 | 7/2015 | McRae |
| 2015/0205805 | A1 | 7/2015 | Gossain et al. |
| 2015/0334338 | A1 | 11/2015 | Lim et al. |
| 2016/0192056 | A1 | 6/2016 | Goldman et al. |
| 2019/0208323 | A1* | 7/2019 | Yazawa ................. H04R 27/00 |

FOREIGN PATENT DOCUMENTS

| | | |
|---|---|---|
| KR | 10-1443061 | 9/2014 |
| KR | 10-2015-0081759 | 7/2015 |
| KR | 10-2015-0131896 | 11/2015 |
| KR | 10-2016-0061870 | 6/2016 |
| WO | 2006/127391 | 11/2006 |
| WO | WO 2015-174753 | 11/2015 |

OTHER PUBLICATIONS

Extended Search Report dated Nov. 10, 2017 in counterpart European Patent Application No. 17194143.8.

India Office Action dated Oct. 31, 2020 for India Application No. 201917019549.

* cited by examiner

CONTENT OUTPUT DEVICE AND CONTROL METHOD THEREOF

CROSS-REFERENCE TO RELATED APPLICATION

This application is based on and claims priority under 35 U.S.C. § 119 to Korean Patent Application No. 10-2016-0142341, filed in the Korean Intellectual Property Office on Oct. 28, 2016, the disclosure of which is incorporated by reference herein in its entirety.

BACKGROUND

1. Field

The present disclosure relates generally to a content output device and a control method thereof, for example, to a content output device which performs group reproduction with an external content output device and a control method thereof.

2. Description of Related Art

With the development of electronic technology, various types of electronic devices have been developed and distributed. Recently, various types of electronic devices including a TV are used in general homes. Such electronic devices have a variety of functions according to user's needs.

For example, an audio signal reproduced by a multimedia reproduction device is transmitted to speaker devices which are connected via a plurality of wireless networks, and audio can have a better sound quality as an audio signal can be output through a plurality of speakers.

However, there is a problem of a transmission delay in network communication as an audio signal is transmitted to a plurality of speaker devices which are located apart from a reproduction device.

SUMMARY

An aspect of example embodiments relates to a content output device which transmits a content in advance via a pre-connected network before a plurality of network connections are completed to output a content within the shortest and/or shorter time period in group reproduction of a content using a plurality of networks, and a control method thereof.

According to an example embodiment, a content output device is provided, the content output device including a communication interface comprising communication circuitry, an output unit comprising output circuitry and a processor configured to control the output unit to output a content received from an external device through the communication interface, control the communication interface to transmit, in response to a output request for the content being received from the external device via a first communication network, the content to an external content output device via the first communication network, and control the communication interface to transmit, in response to completion of setting a connection with the external content output device via a second communication network, the content to the external content output device via the second communication network. Here, the first communication network is connected through an external network apparatus, and the second communication network is connected without going through the external network apparatus.

The first communication network may, for example, and without limitation, be a wireless LAN network based on the external network apparatus, and the second communication network may, for example, and without limitation, be a Wi-Fi peer to peer (P2P) network, and the processor may transmit the content which is transmitted from the external device via the wireless LAN network to the external content output device via the wireless LAN network, and transmit the content to the external content output device via the Wi-Fi P2P network in response to completion of setting a connection with the external content output device via the Wi-Fi P2P network while outputting the content by synchronizing with the external content output device.

The processor may transmit a part of the content subsequent to part of the content transmitted to the external content output device via the first communication network to the external content output device via the second communication network when the external content output device is connected via the second communication network.

The processor may encode the content to a quality less than a predetermined quality and transmit the content to the external content output device via the first communication network, and transmit the content encoded to a quality higher than the predetermined quality to the external content output device via the second communication network in response to connecting with the external content output device via the second communication network.

The content output device and the external content output device may be implemented as a speaker, and the content may be an audio content transmitted from the external device.

The processor may transmit, in response to receiving the output request for grouping the content output device and the external content output device, the content to the external content output device via the first communication network.

A content output device according to an example embodiment may include an output unit comprising output circuitry, a communication interface comprising communication circuitry and a processor configured to buffer, in response to receiving a content from an external content output device via a first communication network, the content to a first reception buffer and to output the buffered content through the output unit, and to buffer, in response to receiving the content via a second communication network after completion of setting a connection with the external content output device via the second communication network, the content to a second reception buffer and to output the buffered content through the output unit. Here, the first communication network is connected through an external network apparatus, and the second communication network is connected without going through the external network apparatus.

The processor may connect the first reception buffer with an output buffer to output the content buffered to the first reception buffer, and switch a buffer connection to connect the second reception buffer with the output buffer in response to the content received via the second communication network being buffered to the second reception buffer.

The processor may switch a buffer connection to connect the second reception buffer with the output buffer if an amount of the content buffered to the second reception buffer exceeds a predetermined threshold value.

The content output device and the external content output device may be implemented as a speaker, and the content may be an audio content.

A content output system including a first content output device and a second content output device is also provided, the content output system including a first content output device comprising circuitry configured to transmit, in response to a content and a output request for the content being received, the content to the second content output device via a first communication network and to output the content by synchronizing with the second content output device, and to set a connection with the second content output device via a second communication network, and a second content output device configured to output, in response to completion of setting a connection with the first content output device via the second communication network, the content received from the first content output device via the second communication network while outputting the content received from the first content output device via the first communication network by synchronizing with the first content output device. Here, the first communication network is connected through an external network apparatus, and the second communication network is connected without going through the external network apparatus.

Meanwhile, a method for controlling a content output device is provided, the method including, in response to receiving a content and a output request for the content from an external device via the first communication network, outputting the content and transmitting the content to the external content output device via a first communication network, and in response to completion of setting a connection with the external content output device via the second communication network, transmitting the content to the external content output device via a second communication network.

The first communication network may be a wireless LAN network based on the external network apparatus, and the second communication network may be a Wi-Fi peer to peer (P2P) network, and the transmitting the content to the external content output device may include outputting the content which is transmitted from the external device via the wireless LAN network and transmitting the content to the external content output device via the wireless LAN network, and transmitting the content to the external content output device via the Wi-Fi peer to peer (P2P) network in response to completion of setting a connection with the external content output device via the Wi-Fi peer to peer (P2P) network.

The transmitting the content to the external content output device may include transmitting a part of the content subsequent to part of the content transmitted to the external content output device via the first communication network to the external content output device via the second communication network when the external content output device is connected via the second communication network.

The transmitting the content to the external content output device may include encoding the content to a quality less than a predetermined quality and transmitting the content to the external content output device via the first communication network, and transmitting the content encoded to a quality higher than the predetermined quality to the external content output device via the second communication network in response to connecting with the external content output device via the second communication network.

The content output device and the external content output device may be implemented as a speaker, and the content may be an audio content transmitted from the external device.

A method for controlling a content output device is also provided, the method including, in response to receiving a content from an external content output device via a first communication network, buffering the content to a first reception buffer and outputting the content, and in response to receiving the content via the second communication network after completion of setting a connection with the external content output device via the second communication network, buffering the content to a second reception buffer and outputting the content. Here, the first communication network is connected through an external network apparatus, and the second communication network is connected without going through the external network apparatus.

The buffering the content to the first reception buffer and outputting the content may include connecting the first reception buffer with an output buffer to output the content buffered to the first reception buffer, and the buffering the content to the second reception buffer and outputting the content may include switching a buffer connection to connect the second reception buffer with the output buffer in response to the content received via the second communication network being buffered to the second reception buffer.

The buffering the content to the second reception buffer and outputting the content may include switching a buffer connection to connect the second reception buffer with the output buffer if an amount of the content buffered to the second reception buffer exceeds a predetermined threshold value.

The content output device and the external content output device may be implemented as a speaker, and the content may be an audio content.

According to various example embodiments, when group reproduction of a content is performed using a plurality of networks, a content may be output within the shortest and/or shorter time period by transmitting the content in advance via a pre-connected network before all the plurality of network connections are completed. Further, a network load and a network delay may be minimized and/or reduced by using an appropriate encoding method according to a characteristic of each network.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Hereinafter, various example embodiments of the present disclosure will be described in greater detail with reference to the accompanying drawings.

Figure 1A:
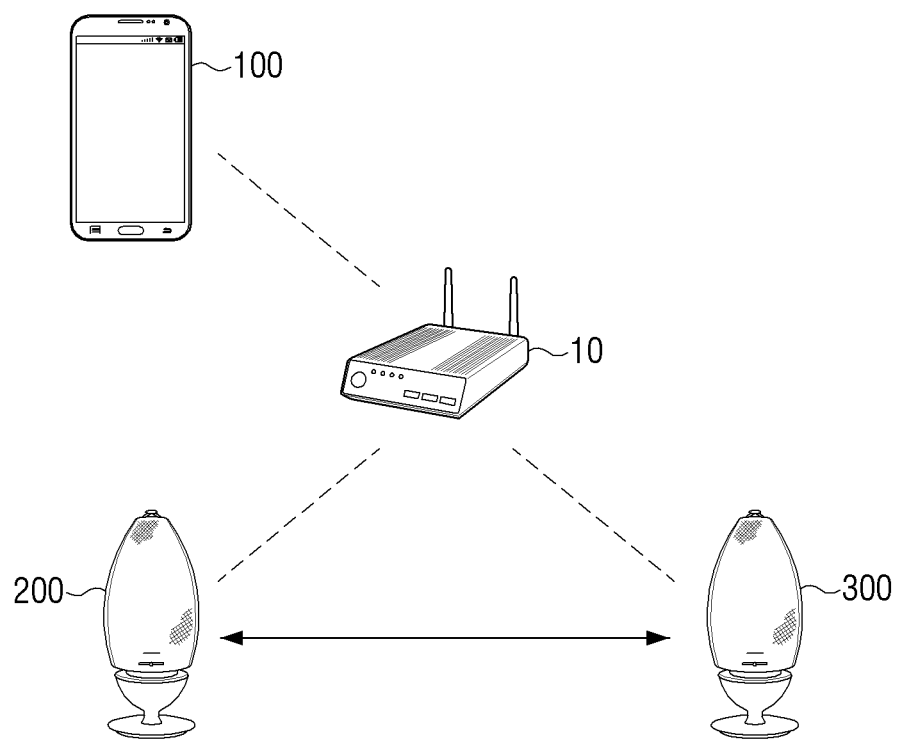
FIGS. 1A and 1B are diagrams illustrating an example of a content output system according to an example embodiment.
Figure 1B:
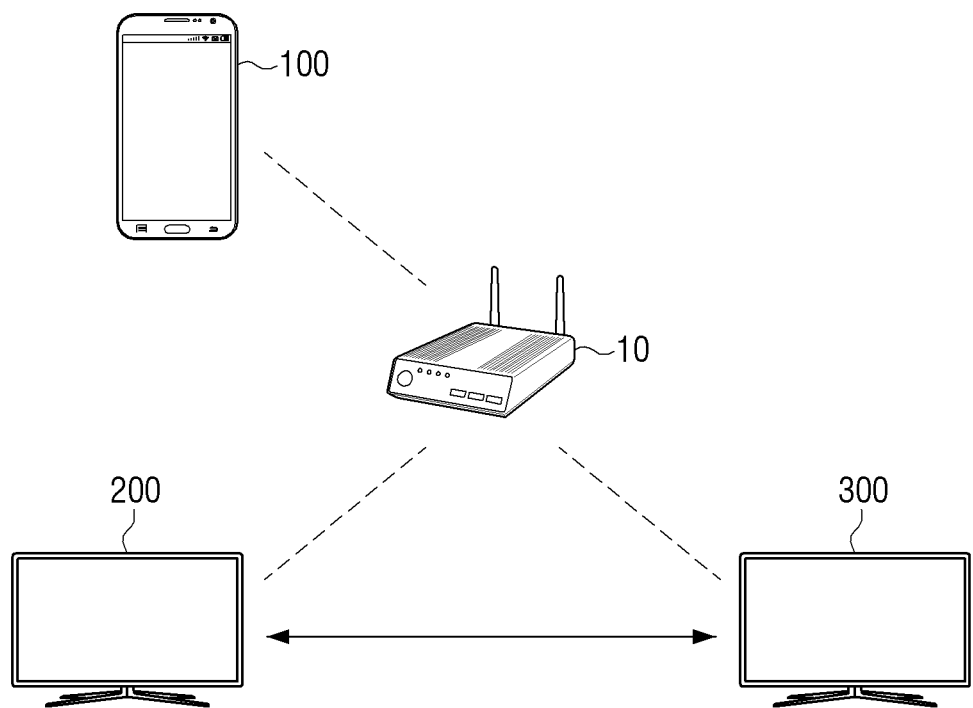

FIGS. 1A and 1B are diagrams illustrating an example of a content output system according to an example embodiment.

According to FIGS. 1A and 1B, the content output system may include a user terminal device 100, a first content output device 200 and a second content output device 300.

The content output system according to an example embodiment may connect the user terminal device 100 (or an electronic device 100) with the first content output device 200 and the second content output device 300 as a system and the system may be implemented as a home network system which can perform bidirectional communication. However, it is not limited to the above example, but the system may be implemented by any system which can connect a plurality of devices via a network to control the devices.

The user terminal device 100 may communicate with the first content output device 200 and the second content output device 300 via a first communication network. For example, the user terminal device 100 may perform Wi-Fi communication based on an access point (AP) 10 with the first content output device 200 and the second content output device 300. The user terminal device 100 may be implemented as various types of electronic devices which can provide a content that is pre-stored or is received from outside, such as, for example, and without limitation, a smartphone, a tablet, a smart TV, an Internet TV, a web TV, an Internet protocol television (IPTV), a signage, a PC, a set-top box, a head-mounted display (HMD) and a wearable device, or the like.

A program for controlling a group reproduction function which groups the first content output device 200 and the second content output device 300 to reproduce a content may be stored in the user terminal device 100. For example, the user terminal device 100 may drive a pre-stored application which controls a group reproduction function of the first content output device 200 and the second content output device 300 to perform the function. In this case, a content may be selected on a UI screen provided by the application, and the first content output device 200 and the second content output device 300 which reproduce the selected content may be grouped. For example, the first content output device 200 and the second content output device 300 which are in different rooms may be grouped and output the same content, or the first content output device 200 and the second content output device 300 which are in the same room may be grouped and output a surround channel.

For instance, as illustrated in FIG. 1A, in the case where the first content output device 200 and the second content output device 300 which are included in a content output system are implemented as speaker devices and output an audio content, a sound channel may be set in each speaker device. For example, if a user intends to set four channels, the grouped four speaker devices may be set as 'Front L,' 'Front R,' 'Surround L' and 'Surround R,' respectively.

The first content output device 200 and the second content output device 300 may be implemented as various types of devices which can output a content. For example, and without limitation, the first content output device 200 and the second content output device 300 may be implemented as a wireless speaker, a sound bar, a speaker provided in a TV, or the like, which can output an audio content as illustrated in FIG. 1A, or implemented as a smartphone, a tablet, a smart TV, an Internet TV, a web TV, an Internet protocol television (IPTV), a signage, a PC, or the like, which can output an image content as illustrated in FIG. 1B.

The first content output device 200 and the second content output device 300 may perform communication via a second communication network. For example, the first content output device 200 and the second content output device 300 may perform communication via a Wi-Fi peer-to-peer (P2P) (or, Wi-Fi direct) communication. The Wi-Fi P2P may refer to a communication method in which the devices including a Wi-Fi system (or Wi-Fi function) directly communicate with each other without going through a Wi-Fi direct AP that supports the connection between Wi-Fi alliance devices.

One of the first content output device 200 and the second content output device 300 may operate as a master device according to the P2P connection method, and the other may operate as a slave device. For example, the first content output device 200, which is the master device, may be implemented to receive a content from the user terminal device 100 and to output the content, and the second content output device 300, which is the slave device, may be implemented to output the content received from the master device.

According to an example embodiment, the first content output device 200 and the second content output device 300 may be implemented as the same type of devices (e.g., speaker devices), but may also be implemented as different types of devices (e.g., a TV and a speaker device). For example, if a TV is operated as a master device, and at least one of home speakers is operated as a slave device, the TV may transmit only an audio content to the home speaker among received image contents.

Hereinafter, various example embodiments to prevent and/or reduce a delay in content output time in the content output system and to minimize and/or reduce a network load and a network delay will be described.

Figure 2A:
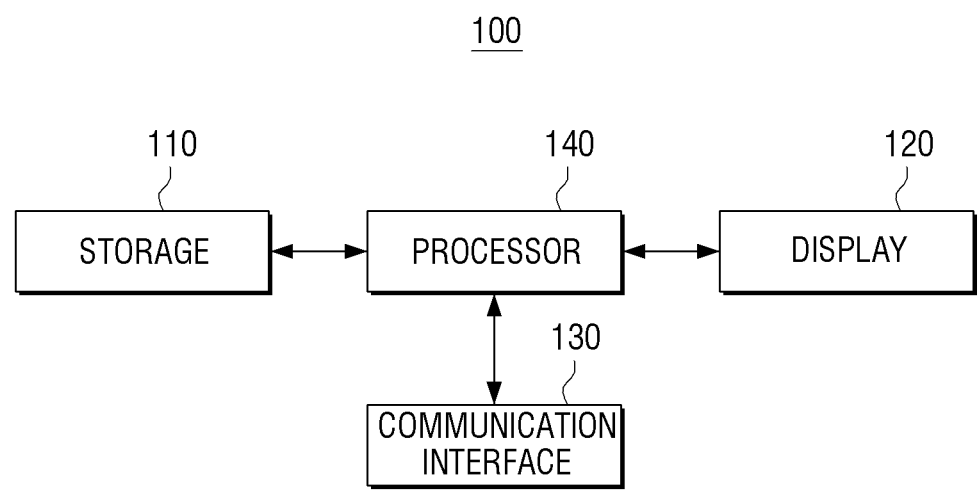
FIG. 2A is a block diagram illustrating an example configuration of a user terminal device according to an example embodiment.

FIG. 2A is a block diagram illustrating an example configuration of a user terminal device according to an example embodiment.

According to 2A, the user terminal device 100 may include a storage 110, a display 120, a communication interface (e.g., including communication circuitry) 130 and a processor (e.g., including processing circuitry) 140.

The storage 110 may store various data, programs or applications to operate and to control the user terminal device 100.

The storage 110 may store a control program for controlling the user terminal device 100, an application firstly provided from a manufacturing company or downloaded from outside, a graphical user interface (GUI) related to an application, an object (e.g., image text, an icon, a button, etc.) for providing a GUI, user information, document, databases or relevant data.

For example, the storage 110 may store a program for performing a group reproduction function of the first content output device 200 and the second content output device 300 (FIG. 1). For example, the user terminal device 100 may store an application which controls a group reproduction function of the first content output device 200 and the second content output device 300.

The storage 110 may further include various program elements, such as, for example, and without limitation, a user sensing module, a communication control module, a voice recognition module, a motion recognition module, an optical receiver module, a display control module, an audio control module, an external input control module, a power control module, a voice database (DB) or a motion database, or the like. For example, the storage 110 may include the data related to various communication modules such as a Wi-Fi module for performing Wi-Fi communication.

The storage 110 may be implemented as an internal memory such as a ROM, a RAM which are included in the processor, or be implemented as a memory separate from the processor 140. In this case, the storage 110 may be implemented as a memory embedded in the user terminal device 100, or be implemented as a memory attachable to and detachable from the user terminal device 100 according to the data storage usage.

The display 120 may be implemented as a liquid crystal display panel (LCD), an organic light emitting diodes (OLED), a liquid crystal on silicon (LCoS), a digital light processing (DLP), or the like, but is not limited thereto. In some cases, the display 120 may be implemented as a touch screen forming a mutual layer structure with a touch pad, and in this case, the display 120 may not only be used as an output device but may also be used as an interface.

The display 120 may provide various UI screens which are provided by an application stored in the storage 110.

For example, the display 120 may provide a UI screen for selecting a content, a UI screen for grouping content output devices which output the selected content, a UI screen for setting a sound channel to each content output device, etc.

The communication interface 130 may include various communication circuitry and perform communication with the first content output device 200 and the second content output device 300 (FIG. 1) via a first communication network. Here, the first communication network may be connected through an external network apparatus. The first communication network may be the method of communicating via Wi-Fi (a wireless LAN network) based on the external network apparatus and the external network apparatus may be AP (access point). In this case, the communication interface 130 may be implemented as a Wi-Fi communication module.

However, it is not limited to the above example. For example, and without limitation, the communication network such as Bluetooth or Zigbee may also be used.

The processor 140 may include various processing circuitry and control overall operations of the user terminal device 100. The processor 140 may include various processing circuitry, such as, for example, and without limitation, one or more of a dedicated processor, a central processing unit (CPU), a controller, a microprocessor, an application processor (AP), a communication processor (CP) or an ARM processor, or the like, or may be defined by such terms. Also, the processor 120 may be implemented as a digital signal processor (DSP) or a SoC including a content processing algorithm, or may be implemented as a field programmable gate array (FPGA).

When a request command for group reproduction of a plurality of content output devices is received, the processor 140 may transmit a content (e.g., an audio content, an image content, etc.) and a request signal for group reproduction to one of the plurality of content output devices through a communication interface 130. The content output device which receives the content and the request signal for group reproduction may be one of a content output device selected by a user and a content output device defined as default.

For example, when a content is selected through a UI screen provided by a pre-stored application and a user command for outputting the selected content by a predetermined output method is input, the processor 140 may transmit a request for outputting the content according to the predetermined output method and the selected content to at least one of the first content output device 200 and the second content output device 300. However, it is not limited to the above example, but any method which can synchronize the first content output device 200 and the second content output device 300 to output a content may be also applied as the predetermined output method. For example, when a user command for grouping the first content output device 200 and the second content output device 300 which output a selected content is input, the content and the request signal for group reproduction may be transmitted to one of the first content output device 200 and the second content output device 300. In this case, the processor may transmit the content and the request signal for group reproduction to the first content output device 200 selected on a corresponding UI screen. The group production may include, for example, the reproduction such as outputting the same channel (e.g., a mono channel) of the same content or outputting different channels of the same content (e.g., channel L and channel R), etc., and also include outputting different contents which forms a harmony with each other (e.g., a video content and an audio content).

Figure 2B:
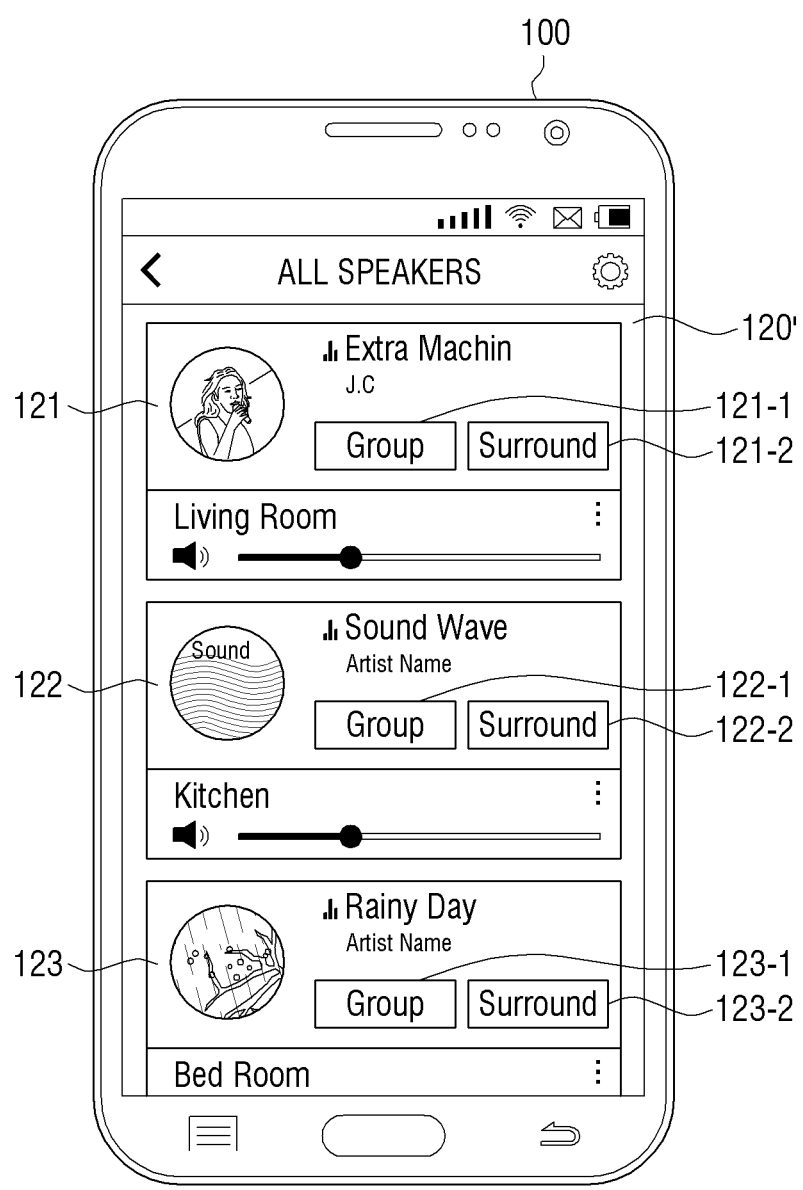
FIGS. 2B and 2C are diagrams illustrating an example of a UI screen according to an example embodiment.
Figure 2C:
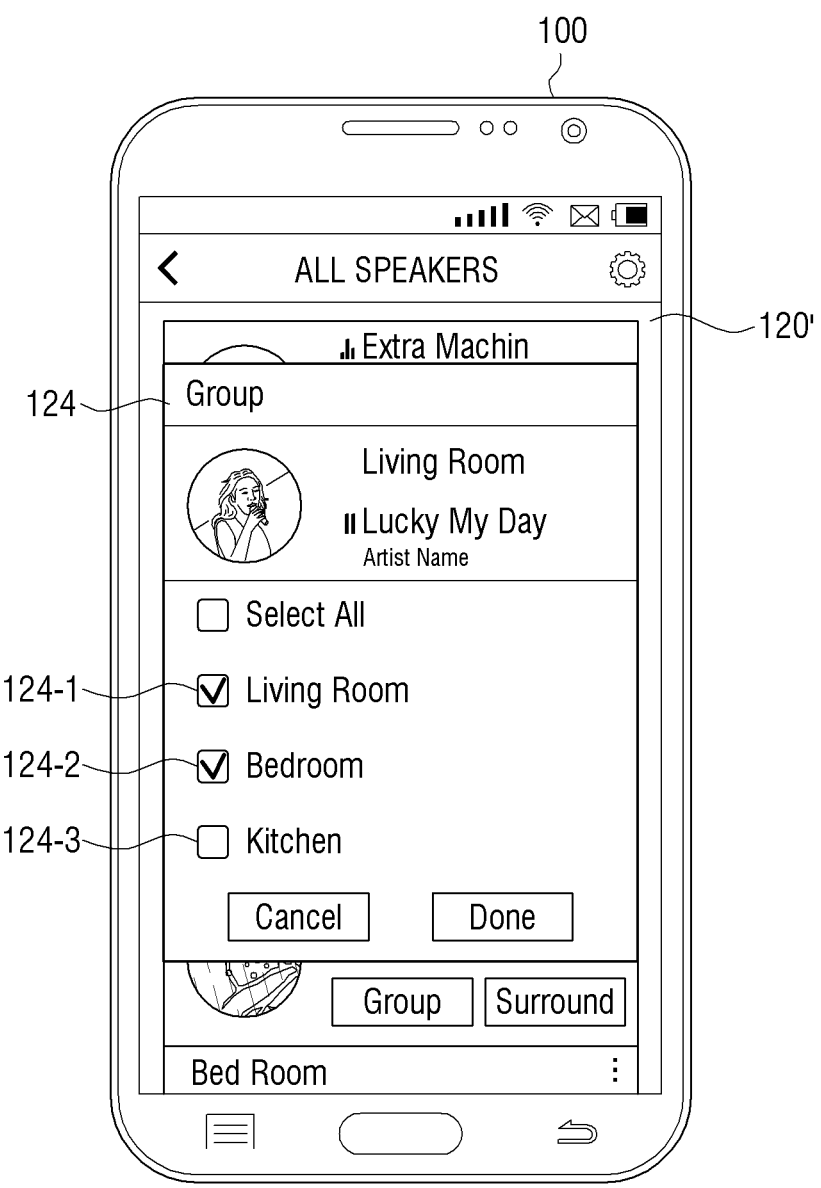

FIGS. 2B and 2C are diagrams illustrating an example of a UI screen according to an example embodiment.

FIGS. 2B and 2C illustrate an example UI screen for grouping a plurality of speaker devices provided in different rooms according to an example embodiment.

As illustrated in FIG. 2B, a screen 120' including a plurality of UI areas 121, 122 and 123 which correspond to the speaker devices in different rooms may be provided. Each of the plurality of UI areas 121, 122 and 123 may include a group setting menu 121-1, 122-1 and 123-1 and a surround setting menu 121-2, 122-2 and 123-2.

When the group setting menu 121-1 of the UI area 121 corresponding to a living room is selected, a UI screen (124) comprising items (124-1, 124-2, 124-3) for selecting the speaker of a room to be grouped may be provided as illustrated in FIG. 2C. The speakers of the selected rooms may be grouped and output the same content, which is, the content of the living room.

The UI screens illustrated in FIG. 2B and FIG. 2C show an example of grouping while the speaker of each room outputs an audio content, and a UI screen for selecting a content source may be provided separately from the grouping screen. Further, a UI screen for grouping a plurality of speaker devices provided in the same space (e.g., in the same room) may also be provided.

If the first content output device 200 and the second content output device 300 are implemented as a speaker device, and a user command for setting a sound channel is input in each speaker device, the processor 140 may transmit a control command for setting a sound channel to each speaker device. For example, if a surround channel is set in the first content output device 200 and the second content output device 300, the processor 140 may transmit the corresponding information to the selected first content output device 200 or to both of the first content output device 200 and the second content output device 300. For example, a sound channel may be set through a surround setting menu 121-2, 122-2 and 123-2 of the UI screen illustrated in FIG. 2B.

According to an example embodiment, when a user command for grouping the first content output device 200 and the second content output device 300 to output a content is received, the processor 140 may transmit the content source to the first content output device 200.

The first content output device 200 and the second content output device 300 may operate based on a peer-to-peer (P2P) communication network, and the first content output device 200 operated as a master may transmit a corresponding content to the second content output device 300. The first content output device 200 may directly encode a content for the second content output device 300 and transmit the content to the second content output device 300.

According to another example embodiment, if a user command for grouping the first content output device 200 and the second content output device 300 to output a content is input, the processor 140 may divide a content for the first content output device 200 and a content for the second content output device 300, and transmit the content to the first content output device 200. For example, the first content output device 200 which operates as a master may transmit the content for the second content output device 300, which is received from the user terminal device 100, to the second content output 300 device as it is.

Figure 3A:
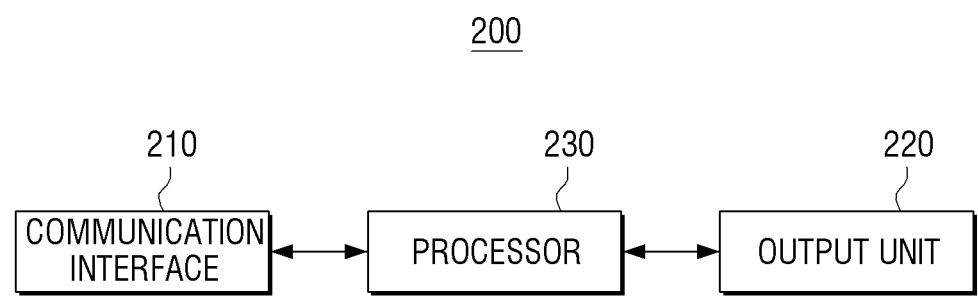
FIG. 3A is a block diagram illustrating an example configuration of a first content output device according to an example embodiment.

FIG. 3A is a block diagram illustrating an example configuration of the first content output device according to an example embodiment.

According to FIG. 3A, the first content output device 200 may include a communication interface (e.g., including communication circuitry) 210, an output unit (e.g., including output circuitry) 220 and a processor (e.g., including processing circuitry) 230.

The communication interface 210 may include various communication circuitry and communicate with an external device (e.g., the user terminal device 100) and the second content output device 300. Hereinafter, an example in which an external device is implemented as the user terminal device 100 will be described for clarity.

The communication interface 210 may communicate with the user terminal device 100 and the second content output device 300 via a first communication network. The first communication network may, for example, be an AP-bases wireless LAN network, and in this case, the first communication network may be implemented as a Wi-Fi communication module. However, it is not limited to the above example, but any communication network which operates similarly to the wireless LAN network may also be used.

The communication interface 210 may communicate with the second content output device 300 via a second communication network. Here, the second communication network may be connected without going through the external network apparatus. The second communication network may be a Wi-Fi peer-to-peer (P2P) network. For example, the second communication network may be a Wi-Fi P2P (or a Wi-Fi direct) network, and in this case, the second communication network may be implemented as a Wi-Fi communication module. However, it is not limited to the above example, but any communication network which operates similarly to the Wi-Fi P2P network may also be used.

The output unit 220 may include various output circuitry and output a content received from the user terminal device 100. The output unit 230 may be implemented, for example, and without limitation, as a display, an audio amplifier, or the like, depending on the embodiment of the first content output device 200.

The processor 230 may include various processing circuitry and control overall operations of the first content output device 200. The example embodiment of the processor 230 may be the same as or similar to the example embodiment of the processor 140 provided in the user terminal device 100, and thus, the detailed description thereof will not be repeated.

When a content and a content output request are received from the user terminal device 100, the processor 230 may transmit the received content to the second content output device 300 via the first communication network. For example, when a group reproduction request for grouping the first content output device 200 and the second content output device 300 to output a content and an object content to be output are received via the first communication network, the processor 230 may transmit the received content to the second content output device 300 via the first communication network. For example, when a request signal for group reproduction and an object content to be output are received via the Wi-Fi network based on an access point (AP) 10 from the user terminal device 100, the processor 230 may transmit the received content to the second content output device 300 via the Wi-Fi network.

Further, when the setting for the connection with the second content output device 300 via the second communication network is completed, the processor 230 may transmit a content to the second content output device 300 through the second communication interface 210. For example, when a request signal for group reproduction is received from the user terminal device 100, the processor 230 may perform the P2P connection with the second content output device 300 and transmit the received content to the second content output device 300 via the P2P network.

The processor 230 may also minimize and/or reduce a network load and a network delay using an appropriate encoding method according to each network characteristic.

For example, the processor 230 may encode a received content to a relatively low quality and transmit the content via the first communication network to minimize and/or reduce the content output time of the second content output device 300. In other words, the processor 230 may encode a content to a relatively low quality as quickly as possible and transmit the content to the second content output device 300 via the first network as fast as possible. When the setting for connection with the second content output device 300 via the second communication network is completed later, a content encoded to a relatively high quality, which is, a quality higher than a predetermined quality, may be transmitted to the second content output device 300 via the second communication network. To this end, the processor 230 may include an encoder, or control an encoding operation of an encoder provided separately.

As another example, the processor 230 may also transmit the received content in a decoded state to the second content output device 300.

As the other example, the processor 230 may also transmit to the second content output device 300 the received content as it is, that is, transmit the encoded content received from the user terminal device 100 as it is.

Figure 4A:
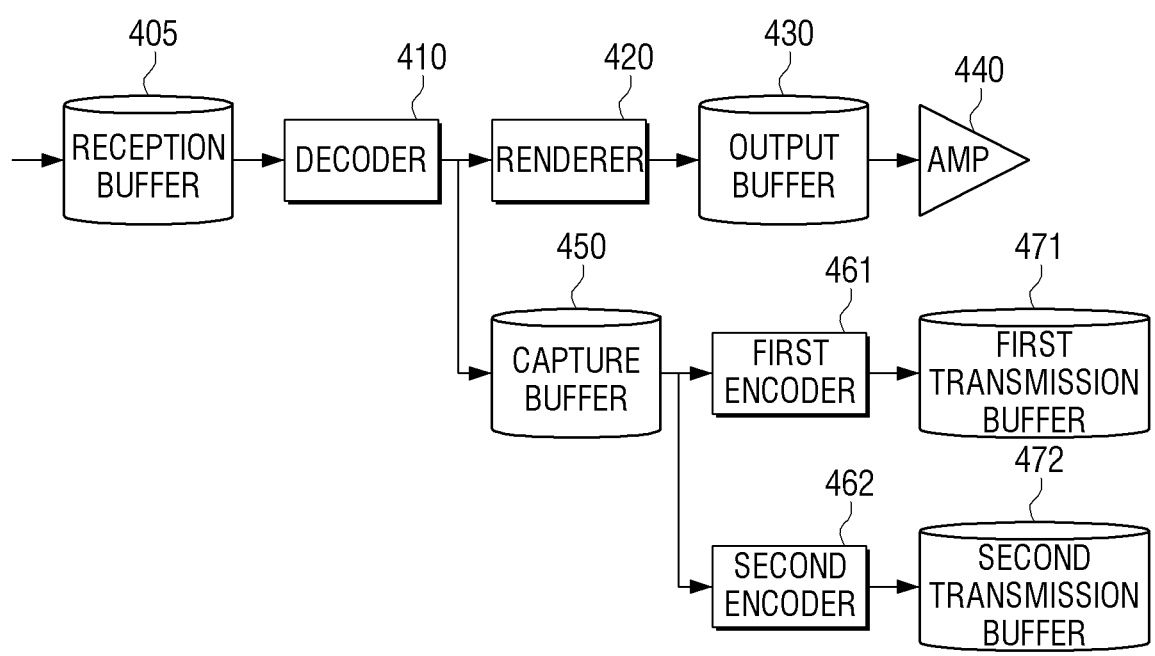
FIGS. 4A, 4B and 4C are diagrams illustrating an example content processing method of a first content output device according to various example embodiments.
Figure 4B:
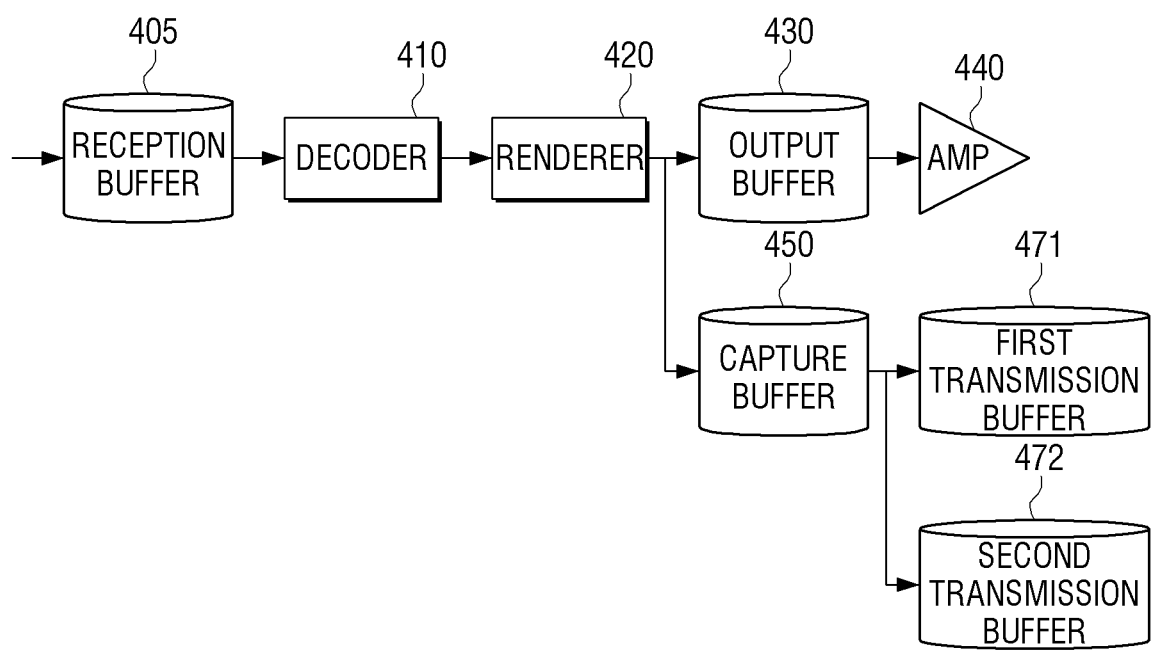
Figure 4C:
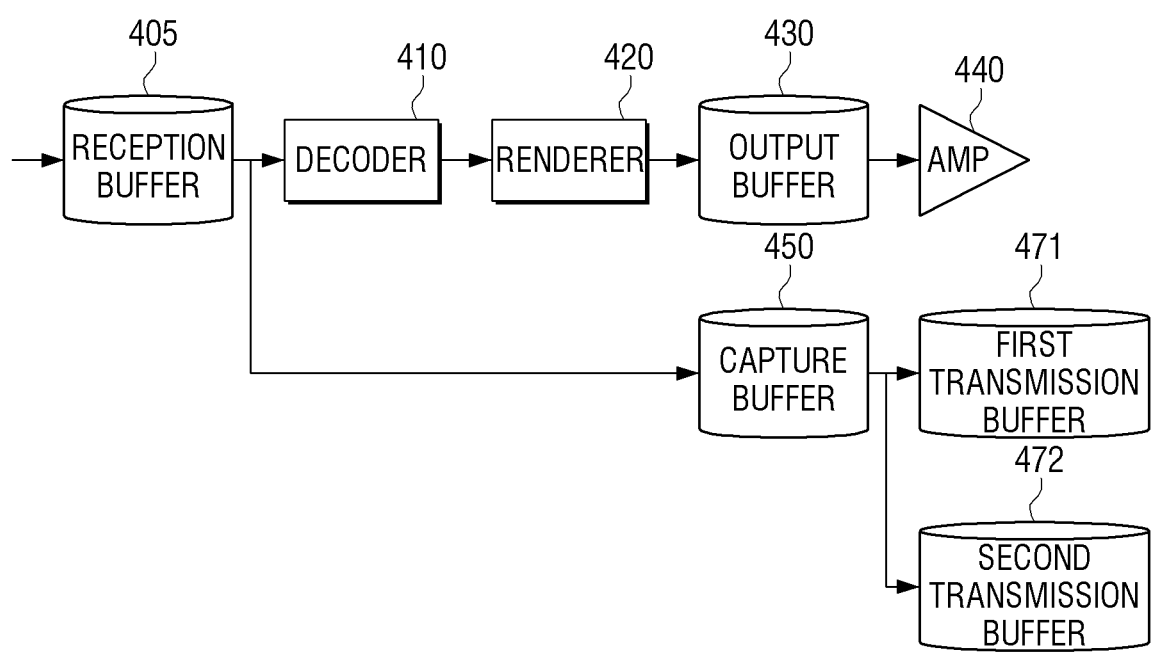

FIGS. 4A, 4B and 4C are diagrams illustrating an example content processing method of a first content output device according to various example embodiments.

FIG. 4A illustrates an example content processing method according to a first example embodiment. According to FIG. 4A, the content received from the user terminal device 100 via the first communication network, which is, for example, a wireless LAN network, may be stored in a reception buffer 405. In this case, the content received from the user terminal device may be a high quality content, which is, a content encoded to a high quality. The content stored in the reception buffer 405 may be provided to a decoder 410 and be decoded, and the decoded content may be provided to a renderer 420. The content may be rendered and copied at the same time, and be buffered to a capture buffer 450. The decoder 410 and the renderer 420 may, for example, be implemented as a digital signal processor (DSP). For example, the decoder 410 and the renderer 420 may, for example, be implemented as a separate DSP chip, or be implemented as a separate signal processing function provided in a DSP chip. The content rendered by the renderer 420 may be buffered to an output buffer (or a reproduction buffer) 430 and be output through an AMP 440. In this case, the processor 230 may delay the time point when the output buffer 430 provides a content to the AMP 440 for synchronization with the second content output device 300. For example, if a function according to an example embodiment is controlled by a certain application, the application may control the content output time point of the output buffer 430.

Meanwhile, as the content buffered to the capture buffer 450 may be encoded to a relatively low quality (or, a low capacity or a low sampling rate) by a first encoder 461, the content may be encoded quickly, and be provided to a first transmission buffer 471 and be transmitted (or be streamed) to the second content output device 300 via a wireless LAN network within a short time period. The first transmission buffer 471 may be implemented as a buffer on the end of a Wi-Fi driver.

If the content received from the user terminal device 100 is an content encoded as surround sound, only the content of the first channel (e.g., channel L) among the contents rendered in the renderer 420 may be provided to the output buffer 430, and the content of the second channel (e.g., channel R) may be buffered to the capture buffer 450, be encoded to a low quality in the first encoder 461 and be provided to the first transmission buffer 471.

Meanwhile, when the setting for the second communication network, which is, for example, the Wi-Fi P2P connection, of the first content output device 200 and the second content output device 300 is completed, the content buffered to the capture buffer 450 may be encoded to a relatively high quality in the second encoder 462, be provided to the second transmission buffer 472 and be transmitted to the second content output device 300 via the Wi-Fi P2P network. The second transmission buffer 472 may be implemented as a buffer on the end of a Wi-Fi driver.

When the setting for the Wi-Fi P2P connection of the first content output device 200 and the second content output device 300 is completed, the operation of the second encoder 462 and the transmission of the content buffered to the second transmission buffer 472 may start and at the same time, the operation of the first encoder 461 may be ceased, and the transmission performed by the first transmission buffer 471 may also be ceased accordingly. However, the operation of the first encoder 461 and the transmission by the first transmission buffer 471 may be continued regardless of the operation of the second encoder 462.

FIG. 4B illustrates an example content processing method according to a second example embodiment, and only the elements which are different from the elements illustrated in FIG. 4A will be described. According to FIG. 4B, the content rendered in the renderer 420 may be buffered to the output buffer 430 and be copied at the same time, and the content may be buffered to the capture buffer 450, be provided to the first transmission buffer 471, and be transmitted to the second content output device 300 via a wireless LAN network.

When the setting for the Wi-Fi P2P connection of the first content output device 200 and the second content output device 300 is completed, the content buffered to the capture buffer 450 may be provided to the second transmission buffer 472 and be transmitted to the second content output device 300 via the Wi-Fi P2P network.

FIG. 4C illustrates a content processing method according to a third example embodiment, and only the elements which are different from the elements illustrated in FIG. 4A will be described.

According to FIG. 4C, the content buffered to the reception buffer 405 may be copied as it is and be buffered to the capture buffer 450, and the content buffered to the capture buffer 450 may be provided to the first transmission buffer 471 and transmitted to the second content output device 300 via a wireless LAN network. In other words, the encoded content transmitted from the user terminal device 100 may be provided to the second content output device 300 as it is.

When the setting for the Wi-Fi P2P connection of the first content output device 200 and the second content output device 300 is completed, the content buffered to the capture buffer 450 may be provided to the second transmission buffer 472 and be transmitted to the second content output device 300 via the Wi-Fi P2P network.

Referring back to FIG. 3A, the processor 230 may transmit a part of content subsequent to the part of content (e.g., a packet, a frame, a chunk) transmitted to the second content output device 300 via the first communication network to the second content output device 300 with reference to the time point when the setting for the connection with the second content output device 300 via the second communication network is completed. For example, the processor 230 may transmit to the second content output device 300 the part of content transmitted to the second content output device 300 via the first communication network or the part of content right after the above part of content or the part of content right before the above part of content.

When the setting for the connection with the second content output device via the second communication network is completed, the processor 230 may cease the transmission of the content which is being transmitted to the second content output device 300 via the first communication network. For example, the processor 230 may cease the transmission of the content via the first communication network after a predetermined threshold time or after a predetermined amount of content is transmitted to the second content output device 300 with reference to the time point when the setting for the connection with the second content output device 300 via the second communication network is completed. However, in some cases, even if the second content output device 300 is connected via the second communication network, the transmission of the content via the first communication network may not be ceased but be continued.

Meanwhile, according to another example embodiment, if the first content output device 200 and the second content output device 300 are implemented as different devices which output a different type of content, the first content output device 200 and the second content output device 300 may output only the part of content which the corresponding device can output. For example, it is assumed that the first content output device 200 is implemented as a display apparatus such as a TV, and that the second content output device 300 is implemented as an audio output device such as a home theater. If a received content includes a video content and an audio content, the processor 230 may divided the received content as a video content and an audio content, and output the video content through an output unit 220 and transmit the audio content to the second content output device 300 by the method described above.

Figure 3B:
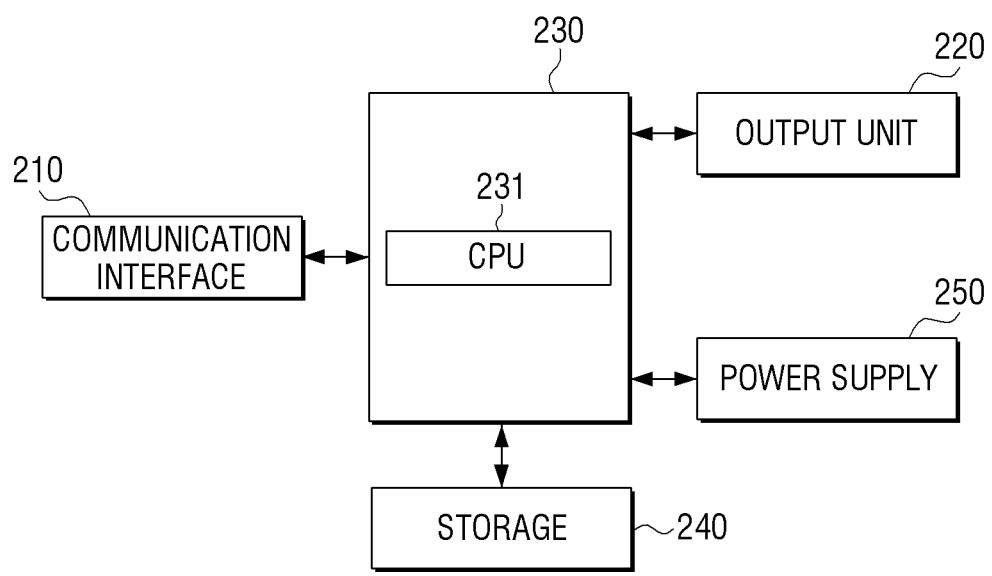
FIG. 3B is a diagram illustrating an example configuration of a first content output device according to an example embodiment.

FIG. 3B is a block diagram illustrating an example configuration of a first content output device according to an example embodiment.

According to FIG. 3B, the first content output device 200 may include the communication interface (e.g., including communication circuitry) 210, the output unit (e.g., including output circuitry) 220, the processor (e.g., including processing circuitry) 230, a storage 240 and a power supply 250. The description for the elements in FIG. 3B which are overlapped with the elements illustrated in FIG. 3A will not be repeated.

The processor 230 may include various processing circuitry, such as, for example, and without limitation, a CPU 231, a ROM (or a non-volatile memory, not shown) in which a control program for controlling the first content output device 200 is stored and a RAM (or a volatile memory, not shown) in which the data input from the outside of the first content output device 200 is stored or which is used as a storage area corresponding to various operations performed in the first content output device 200.

The processor 230 may control the power supplied from the power supply 250 to the internal components 210 to 240. Also, when a predetermined event occurs, the processor 230 may execute an operating system (O/S) and various applications which are stored in the storage 240. The processor 230 may include, for example, and without limitation, a single core, a dual core, a triple core, a quad core and a multiple core.

The CPU 231 may access to the storage 240 and perform booting using the O/S stored in the storage 240. The CPU 231 may also perform various operations using various programs, contents and data which are stored in the storage 240.

Further, the processor 230 may include a digital signal processor (DSP), and the DSP may add various functions such as digital filtering, effect, sound field effect, etc., and the technique of over-sampling which prevents degradation in sound quality in conversion between digital and analog through a sample rate converter (SRC) may also be applied.

The storage 240 may store various data, programs or applications for operating and controlling the first content output device 200. The storage 240 may store a control program for controlling the first content output device 200 and the processor 230, an application firstly provided by a manufacturing company or downloaded from outside, and databases and relevant data.

Particularly, the storage 240 may store an audio content received from the user terminal device 100. In this case, the storage 240 may store an audio content source according to the type of audio content received from the user terminal device 100 or store an audio content encoded to a high quality or to a low quality.

The storage 240 may be implemented as an internal memory such as a ROM and a RAM which are included in the processor 230, and/or may be implemented as a separate memory from the processor 230. In this case, the storage 240 may be implemented as an embedded memory in the content output device 200 or be implemented as a memory which is attachable to and detachable from the content output device 200 according to the data storage usage. For example, the data for driving the content output device 200 may be stored in the embedded memory in the content output device 200, and the data for the extending function of the content output device 200 may be stored in the memory which is attachable to and detachable from the content output device 200. The embedded memory in the content output device 200 may be implemented as a non-volatile memory, a volatile memory and a hard disk drive (HDD), a solid state drive (SSD), or the like, and the memory attachable to and detachable from the content output device 200 may be implemented as a memory card (e.g., a micro SD card, a USB memory, etc.), an external memory (e.g., a USB memory), or the like.

The power supply 250 may supply power input from an external power source to the internal components 210 to 240 of the first content output device 200 under control of the processor 230.

Figure 5:
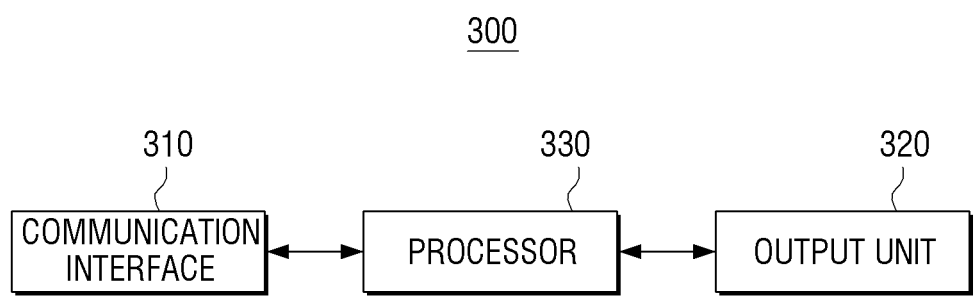
FIG. 5 is a block diagram illustrating an example configuration of a second content output device according to an example embodiment.

FIG. 5 is a block diagram illustrating an example configuration of a second content output device according to an example embodiment.

According to FIG. 5, the second content output device 300 may include a communication interface (e.g., including communication circuitry) 310, an output unit (e.g., including output circuitry) 320 and a processor (e.g., including processing circuitry) 330. The first content output device 200 and the second content output device 300 may be implemented as a speaker device, but are not limited thereto.

The communication interface 310 may include various communication circuitry and communicate with the external user terminal device 100 and the first content output device 200.

For example, the communication interface 310 may communicate with the external user terminal device 100 and with the first content output device 200 via the first communication network. The first communication network may be an AP-basis wireless LAN network, but is not limited thereto. The first communication network may be any communication network which operates similarly to the wireless LAN network.

The communication interface 310 may communicate with the second communication network via the first content output device 200. The second communication network may be a peer-to-peer (P2P) network. For example, the second communication network may be a Wi-Fi P2P (or a Wi-Fi direct) network, but is not limited thereto. The second communication network may be any communication network which operates similarly to the P2P network.

The output unit 320 may include various output circuitry and output a content received from the first content output device 200. The output unit 320 may be implemented as a display, an audio amplifier, etc. depending on the implementation of the second content output device 300.

The processor 330 may include various processing circuitry and control overall operations of the second content output device 300. The example implementation of processor 330 may be the same as or similar to the implementation of the processor 240 provided in the first content output device 200, and thus, the detailed description therefor will not be repeated.

When a content is received from the first content output device 200 via the first communication network, the processor 330 may buffer the received content to the first reception buffer and output the content through the output unit 320.

When the setting for the connection with the first content output device 200 via the second communication network is completed and a content is received via the second communication network, the processor 330 may buffer the received content to the second reception buffer and output the content through the output unit 320.

The processor 330 may connect the first buffer with the output buffer and output the received content to the first buffer, but when the content transmitted via the second communication network is received in the second buffer, the processor 330 may switch the buffer connection and connect the second buffer with the output buffer.

The first content output device 200 and the second content output device 300 may be implemented as a speaker device and also an image output device such as a TV, etc., but hereinafter, it is assumed that the first content output device 200 and the second content output device 300 are implemented as a speaker device for ease of description.

Figure 6A:
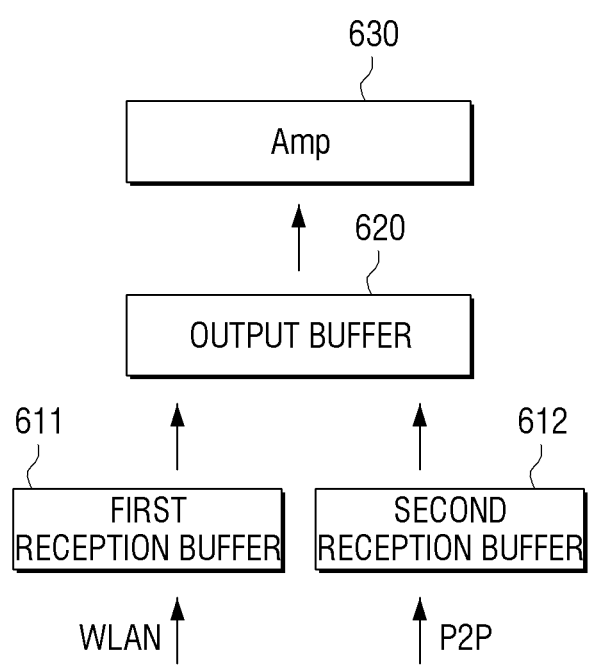
FIGS. 6A and 6B are diagrams illustrating an example operation of a second content output device according to an example embodiment.
Figure 6B:
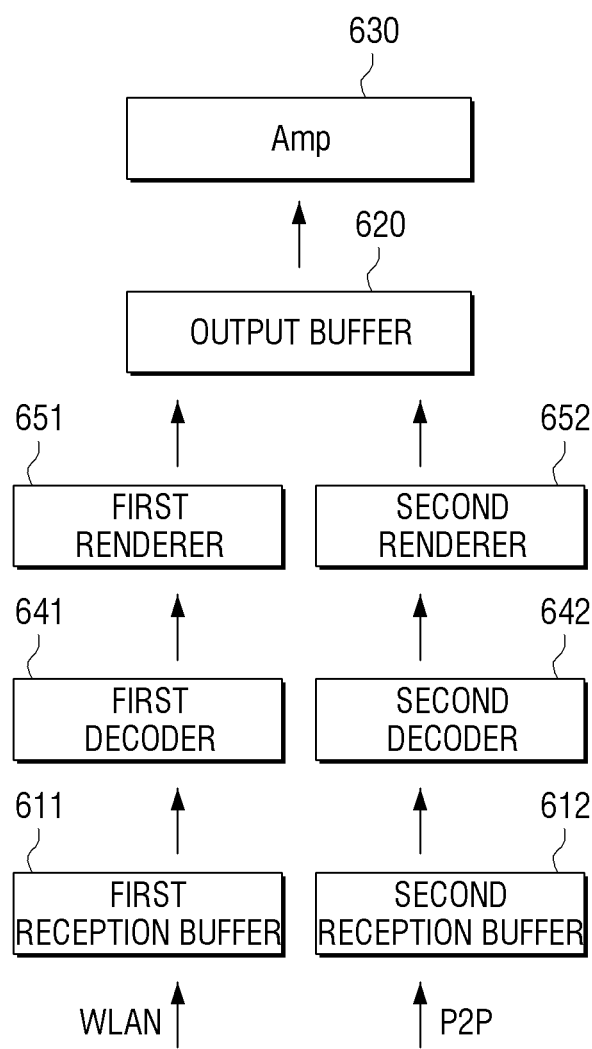

FIGS. 6A and 6B are diagrams illustrating an example configuration of a second content output device according to an example embodiment.

According to FIG. 6A, the processor 330 may buffer the audio content received from the first content output device 200, which is a first speaker device, via the first communication network, which may, for example, be a WLAN, to the first reception buffer 611 and provide the content to the output buffer 620. In this case, the content received via WLAN may be an audio content encoded to a relatively low quality, but is not limited thereto.

When the setting for the connection with the first content output device 200 via the second communication network is completed, the processor 330 may buffer the audio content received via the second communication network, which is, for example, P2P, to the second reception buffer 612, and switch the buffer connection and connect the second reception buffer 612 with the output buffer 620. The content received via P2P may be an audio content encoded to a relatively high quality, but is not limited thereto.

According to an example embodiment, the processor 330 may switch the buffer connection and connect the second reception buffer 612 with the output buffer 620 after a predetermined time elapses from the time point when the setting for the connection via the second communication network is completed.

According to another example embodiment, the processor 330 may switch the buffer connection based on the amount, the buffering time, etc. of an audio content (e.g., a pack, a frame, a chunk, etc.) buffered to the second reception buffer 612 and connect the second reception buffer 612 with the output buffer 620. For example, if the amount of the audio content buffered to the second reception buffer 612 exceeds a predetermined threshold value, the processor 330 may switch the buffer connection and connect the second reception buffer with the output buffer 620.

The audio content sequentially buffered to the output buffer 620 may be transmitted to an amplifier 630 and be output.

FIG. 6B is a diagram illustrating the configuration illustrated in FIG. 6A with more detail.

According to FIG. 6B, the audio content transmitted from the first content output device 200, which is the first speaker device, via the first communication network, which is, for example, WLAN, may be buffered to the first reception buffer 611, and the content may be provided to the first decoder 641 and be decoded. The decoded audio content may be provided to a first renderer 651 and be rendered (e.g., be filtered, be panned, etc.), and be provided to the output buffer 620.

When the setting for the connection with the first content output device 200 via the second communication network is completed, the audio content received from the first content output device 200 via the second communication network, which is, for example, P2P, may be buffered to the second reception buffer 612, and the content may be provided to the second decoder 642 and be decoded. The decoded audio content may be provided to a second renderer 652 and be rendered (e.g., be filtered, be panned, etc.), and be provided to the output buffer 620. In this case, the processor 330 may switch the buffer connection and connect the second reception buffer 612 with the output buffer 620 instead of the first reception buffer 611.

As described above, while the second network connection is set, the audio content received via the first network may be output, and group reproduction of the content may be performed within the shortest and/or shorter time period.

Figure 7A:
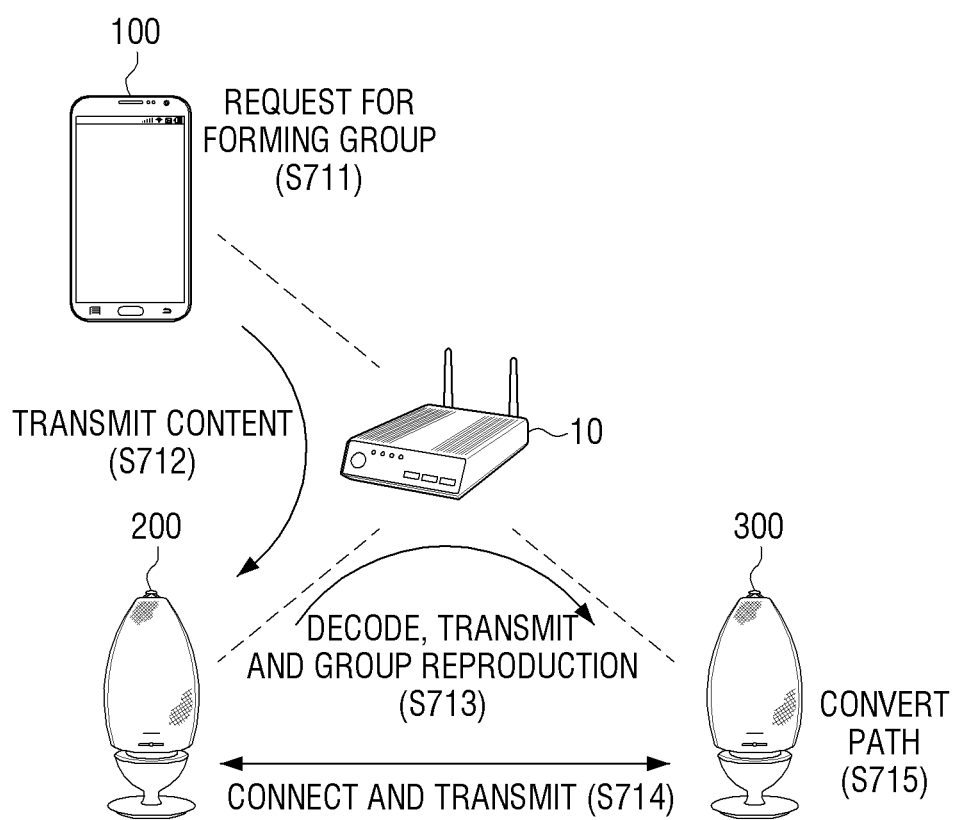
FIGS. 7A and 7B are diagrams illustrating an example operation between a user terminal device and first and second content output devices according to an example embodiment.
Figure 7B:
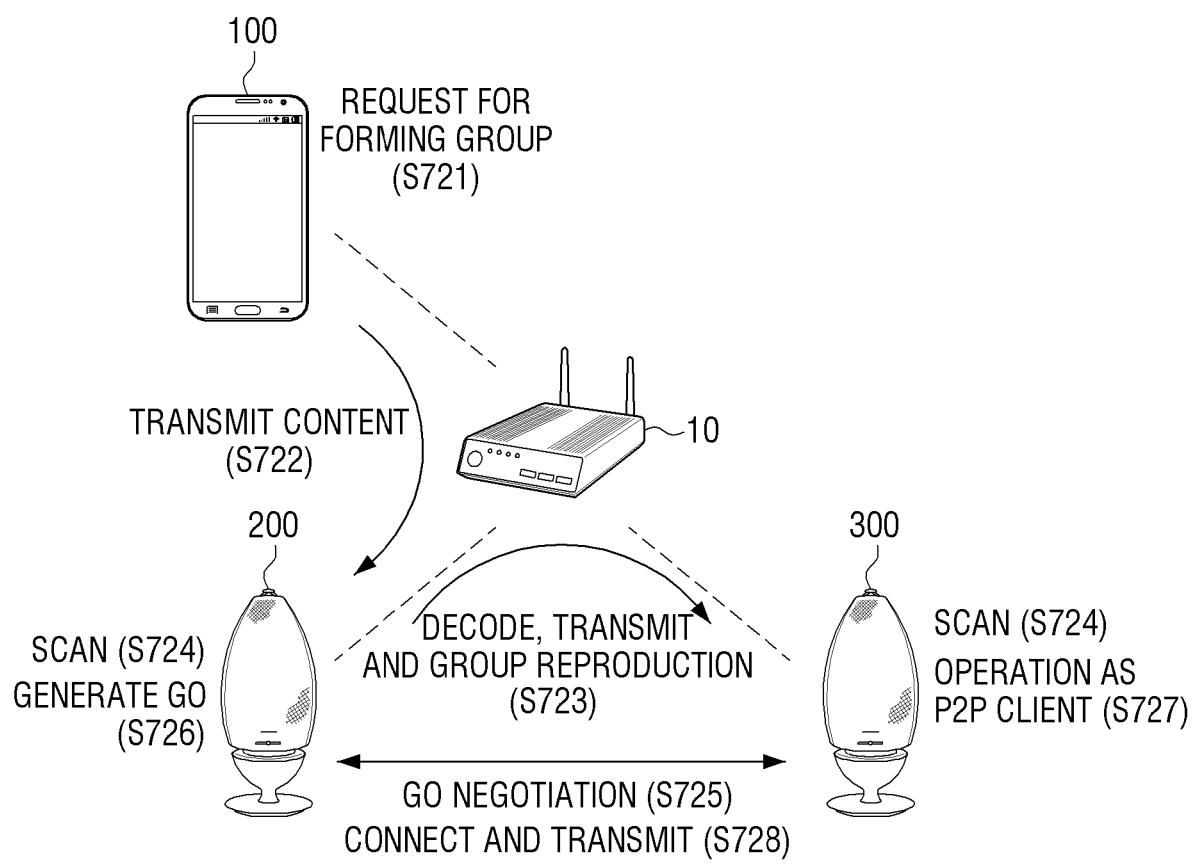

FIGS. 7A and 7B are diagrams illustrating an example operation between a user terminal device and a first and second content output devices according to an example embodiment. In FIGS. 7A and 7B, it is assumed that the first content output device 200 and the second content output device 300 are implemented as a speaker device for ease of description.

According to FIG. 7A, when a certain audio content is selected in the user terminal device 100, and a group request command for grouping the selected audio content in the first content output device 200 and the second content output device 300 to output the content is received (S711), the user terminal device 100 may transmit the selected content and the group request signal to the first speaker 200 via the first communication network, which is, for example, a wireless LAN network (S712). The first speaker device 200 may be a master device which is selected in the user terminal device 100. The group request signal may include a grouping control signal and identification information related to a counterpart device to be grouped, etc. In some cases, the user terminal device 100 may transmit the group request signal to the second speaker device 200 via the first communication network.

For example, the user terminal device 100 may transmit a pre-stored audio content to the first speaker device 200 by a predetermined transmission unit (e.g., an audio packet, an audio frame, an audio chunk, etc.) in real time via the first communication network. In this case, the first speaker device 200 may transmit the consecutively received audio content to the second speaker device 300 via the first communication network. For example, the user terminal device 100 may transmit the audio content to the first speaker device 200 by streaming based on a predetermined transmission unit, and the second speaker device 200 may transmit a received audio content to the second speaker device 300 by streaming based on a predetermined transmission unit.

In this case, the first speaker 200 may encode the received audio content to a relatively low quality and transmit the content to the second speaker device 300. For example, if the audio content received from the user terminal device 100 is a content encoded to a high quality, the first speaker device 200 may transmit the audio content to the second speaker device 300 as it is, but in some cases, the first speaker device 200 may encode the audio content to a relatively low quality and transmit the content to the second speaker device 300.

While the first speaker device 200 transmits the received audio content to the second speaker device 300 via the first communication network, the first speaker device 200 may decode the received audio content and perform group reproduction of the content with the second speaker device 300 (S713). The first content output device 200 and the second content output device 300 may synchronize the output of the content to reproduce the content. Various methods may be applied to the output synchronization of the first content output device 200 and the second content output device 300. For example, the unit of the audio content received in the first speaker device 200 and the unit of the audio content received in the second speaker device 300 may include time information such as the current time, the reproduction time, etc.

While the first speaker device 200 transmits the received audio content to the second speaker device 300 via the first communication network, the first speaker device 200 may perform the operation for connecting with the second speaker device 300 via the second communication network (S714). The second communication network may be a peer-to-peer communication (P2P) network such as a Wi-Fi P2P (or a Wi-Fi direct) network.

While the second speaker device 300 buffers the audio content received from the first speaker device 200 via the first communication network to the first reception buffer and performs group reproduction of the content with the first speaker device 100, the second speaker device 300 may perform the setting for the connection with the first speaker device 200 via the second communication network.

When the setting for the connection of the first content output device 200 and the second content output device 300 via the second communication network is completed, the first speaker device 200 may transmit the content to the second speaker device 300 via the second communication network (S715).

When the content is received from the first speaker device 200 via the second communication network, the second speaker device 300 may buffer the received content to the second reception buffer and perform group reproduction of the content with the first speaker device 100.

FIG. 7B is a diagram illustrating an example of network connection of a first content output device 200 and a second content output device 300 according to an example embodiment.

FIG. 7B illustrates an example in which the second communication network is a Wi-Fi P2P communication network. Operations S721, S722 and S723 in FIG. 7B are similar to operations S711, S712 and S713 in FIG. 7A, and thus, the detailed description for operations S721, S722 and S723 will not be repeated.

After operations S721, S722 and S723, while the first speaker device 200 transmits the received audio content to the second speaker device 300 via the first communication network, the first speaker device 200 may perform an operation for connecting with the second speaker device 300 via the second communication network.

For example, the first speaker device 200 and the second speaker device 300 may perform a scanning operation (S724). In the scanning operation, the first speaker device 200 and the second speaker device 300 may scan all the channels defined in a Wi-Fi communication standard, and collect the information on nearby devices and a network environment. When the Wi-Fi P2P function is executed, the first speaker device 200 and the second speaker device 300 may select a plurality of channels sequentially, and perform the scanning through each channel. The channel to be scanned may be a channel of a band 2.4 GHz or 5 GHz which are defined in a Wi-Fi communication standard.

After the scanning, the first speaker device 200 and the second speaker device 300 may perform a listening operation and a searching operation repeatedly to discover an external device which performs the Wi-Fi P2P communication.

For example, in the listening operation, each of the first speaker device 200 and the second speaker device 300 may select a certain channel and wait for a probe request packet which an external device transmits, and perform the listening operation for a predetermined time period. When the probe request packet which an external device transmits in the searching operation is received, a probe response packet may be transmitted to the external device. Also in the searching, the probe request packet may be transmitted through a certain channel, and the probe response packet may be received through each channel which transmits the probe request packet.

As such, while the first speaker device 200 and the second speaker device 300 repeat the listening operation and the searching operation and if the first speaker device 200 and the second speaker device 300 reach a common channel, the first speaker device 200 and the second speaker device 300 may exchange device-related information such as a device name, a device type, etc. and discover each other. For example, when the first speaker device 200 transmits a probe request packet through a certain channel when the first speaker device 200 performs the searching operation, the second speaker device 300 which performs the listening operation through the channel may transmit the probe response packet to the first speaker device 200. Accordingly, the first speaker device 200 may discover the nearby second speaker device 300 which can perform a Wi-Fi P2P communication.

When such a device discovery process is completed, a group forming operation may be performed (S725). The group forming may refer to the operation in which a role of a P2P group owner (GO) and a role of a P2P client are determined between the devices which perform a Wi-Fi P2p communication. Accordingly, the device which is determined as a P2P GO may perform such a function as an excess point, and the device which is determined as a P2P client may perform such a function as a station. The group forming may be determined by a group owner negotiation protocol of the Wi-Fi P2P connection process. For example, the first speaker device 200 may transmit a GO negotiation request packet to the second speaker device 300 retrieved by searching through a common channel, and when a GO negotiation response packet is received from the second speaker device 300, the first speaker device 200 may transmit a GO negotiation confirmation to the second speaker device 300 and perform a group negotiation.

In this case, the first speaker device 200 may operate as a P2P group owner (GO), and the second speaker device 300 may operate as a P2P client (S726 and S727) based on the information (e.g., a group owner intent) included in each packet. The first speaker device 200 may perform a Wi-Fi P2P communication with the second speaker device 300 through the connected channel (for example, an operating channel). As such, the first speaker device 200 and the second speaker device 300 may perform a Wi-Fi P2P communication in accordance with a Wi-Fi communication standard.

Figure 8:
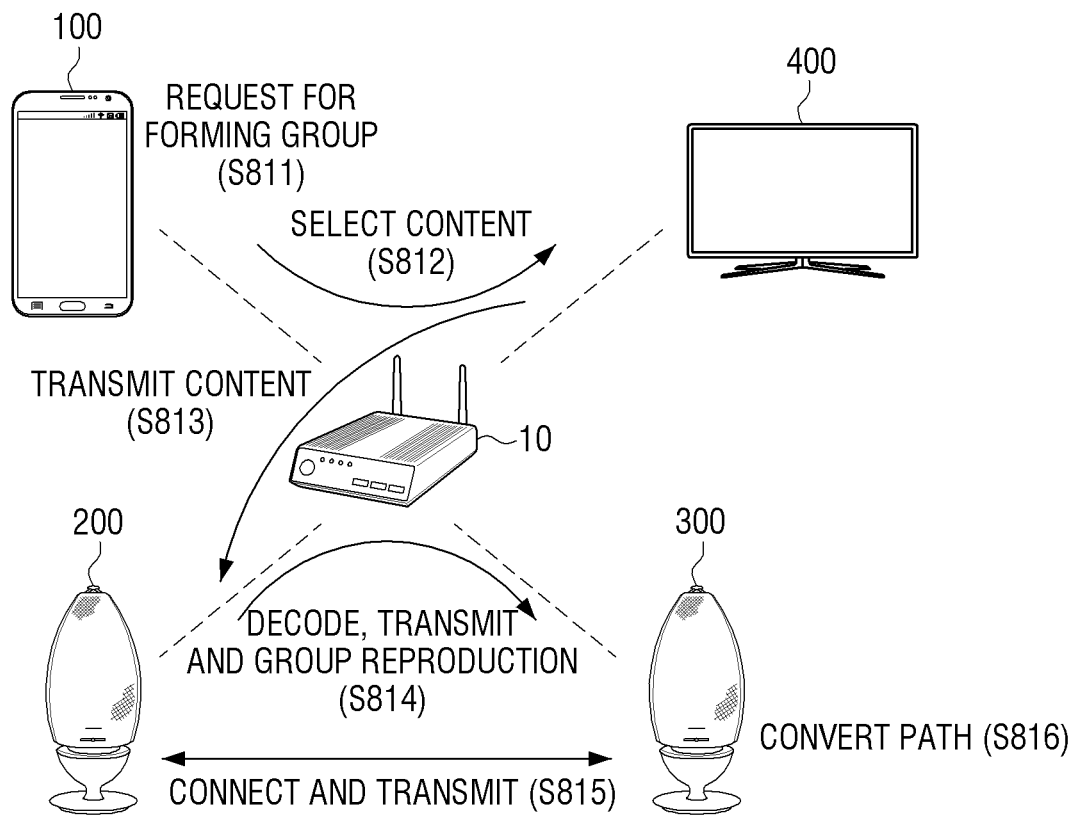
FIG. 8 is a diagram illustrating an example operation between a user terminal device and first and second content output devices according to another example embodiment.

FIG. 8 is a diagram illustrating an example operation between a user terminal device and a first and second content output devices according to an example embodiment.

FIG. 8 illustrates an example embodiment in which a content source is provided by a separate source device 400, not by the user terminal device 100.

According to FIG. 8, a content output request, which is, for example, a group output request for grouping the first speaker device 200 and the second speaker device 300 to output a content, may be received (S811), and when the content of a source device 400 is selected as a reproduction content (S812), the source device 400 may transmit the selected content to the first content output device 200 via the first communication network, which is, for example, a wireless LAN network (S813). Operations S814, S815 and S816 are the same as operations S713, S714 and S715 illustrated in FIG. 7A, and thus, the detailed description for operations S814, S815 and S816 will not be repeated.

Figure 9:
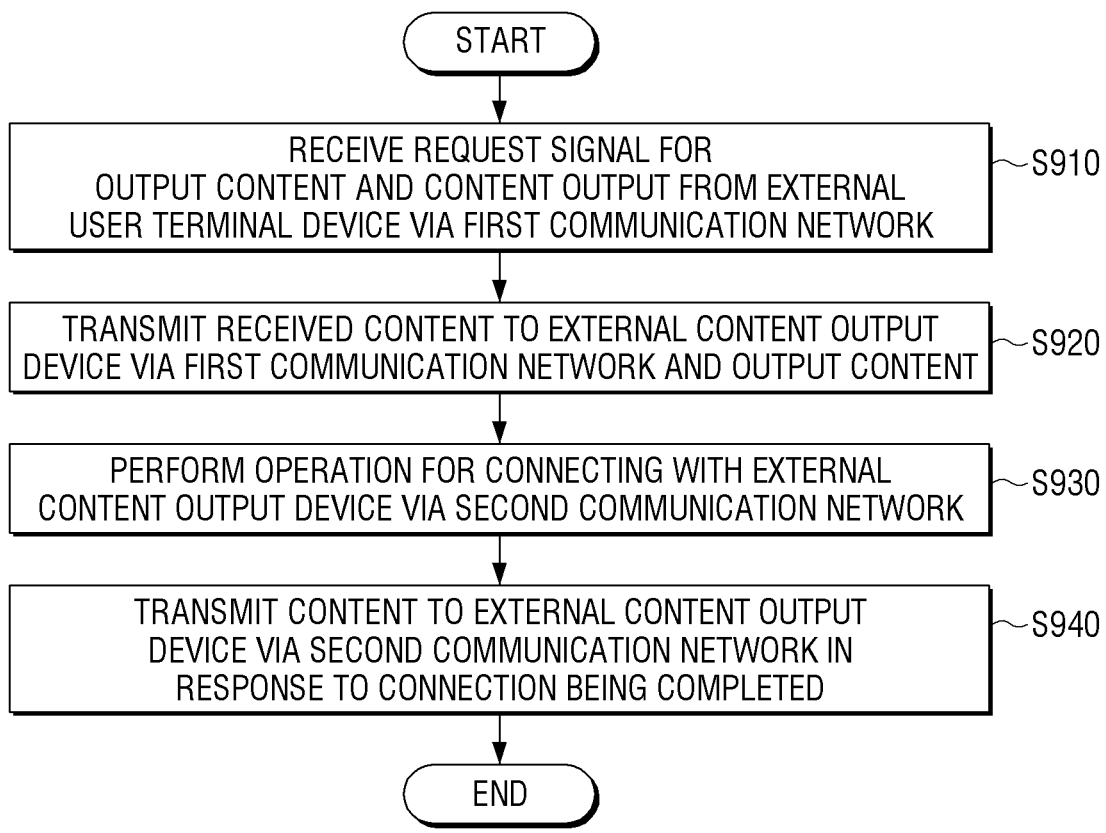
FIG. 9 is a flowchart illustrating an example control method of a first content output device according to an example embodiment.

FIG. 9 is a flowchart illustrating an example control method of the first content output device according to an example embodiment.

According to the control method of the first content output device 200 illustrated in FIG. 9, an output object content and a content output request may be received from the external user terminal device 100 via the first communication network (S910). For example, the content output request may be an output request for grouping the content output device 200 and the external content output device 300.

The received content may be transmitted to the second content output device 300 via the first communication network, and the first content output device 200 may be synchronized with the second content output device 300 and the content may be output (S920). Here, the first communication network may be connected through an external network apparatus. In this case, the communication interface 130 may be implemented as a Wi-Fi communication module. The first communication network may be wireless LAN network based on the external network apparatus and the external network apparatus may be AP (access point). In this case, in operations S910 and S920, the content transmitted from the user terminal device 100 via a wireless LAN network may be transmitted to the external content output device 300 via the wireless LAN network.

At the same time, the setting for the connection with the second content output device 300 via the second communication network may be performed (S930). The second communication network may be connected without going through the external network apparatus. The second communication network may be a Wi-Fi peer-to-peer (P2P) network.

When the setting for the connection via the second communication network is completed, the content may be transmitted to the second content output device 300 via the second communication network (S940).

In operations S930 and S940, the first content output device 200 may be synchronized with the second content output device 300 and the content may be output, and when the setting for the connection with the second content output device 300 via the Wi-Fi P2P is completed, the content may be transmitted to the second content output device 300 via the Wi-Fi P2P.

In operation S940, a part of the content subsequent to the part of the content transmitted to the second content output device 300 via the first communication network may be transmitted to the second content output device 300 with reference to the time point when the setting for the connection with the second content output device 300 via the second communication network is completed.

In operation S920, the content may be encoded to a quality lower than a predetermined quality and be transmitted to the second content output device 300 via the first communication network, and in operation S940, the content encoded to a quality higher than a predetermined quality may be transmitted to the second content output device 300 via the second communication network.

Figure 10:
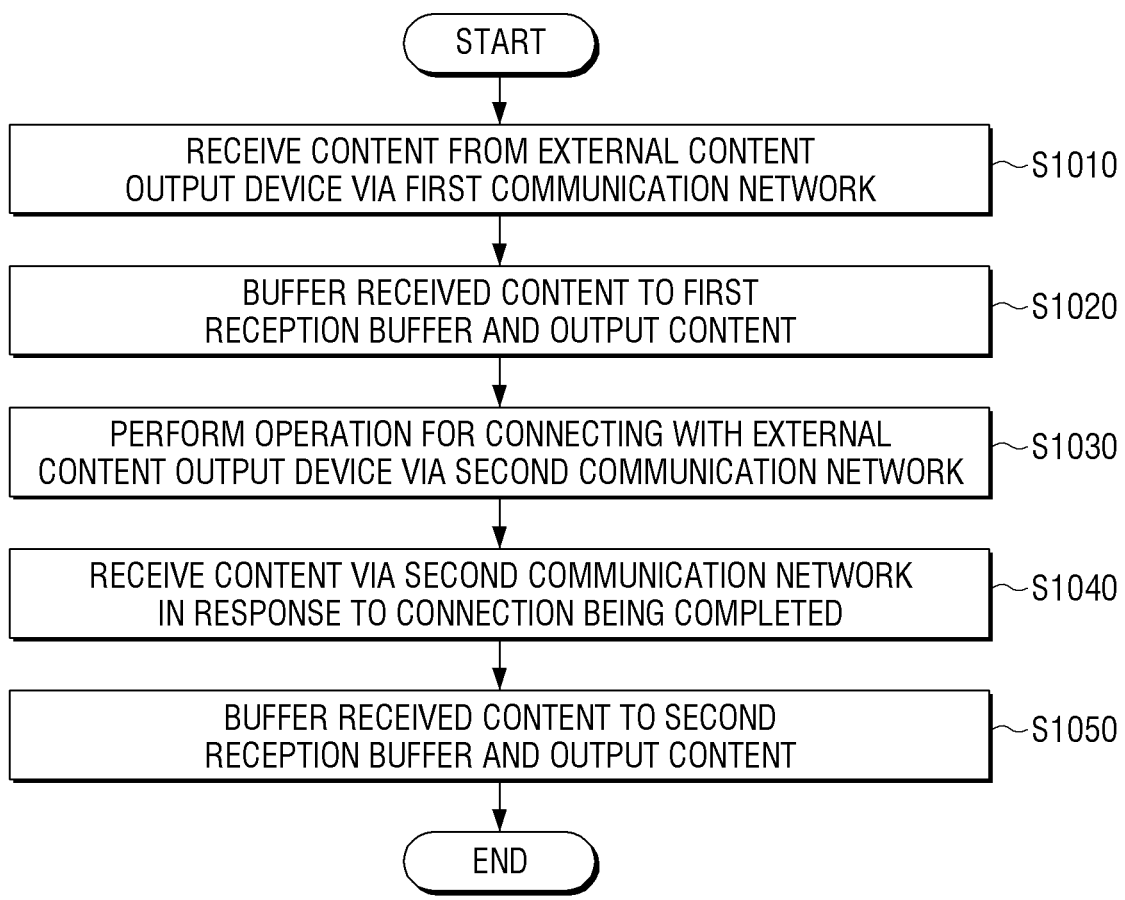
FIG. 10 is a flowchart illustrating an example control method of a second content output device according to an example embodiment.

FIG. 10 is a flowchart illustrating an example control method of a second content output device according to an example embodiment.

According to the control method of the second content output device 300 illustrated in FIG. 10, a content is received from the first content output device 200 via the first communication network (S1010), and the received content may be buffered to a first reception buffer and be output (S1020). In this case, the first reception buffer may be connected with an output buffer to output the content buffered to the first reception buffer.

When the setting for the connection with the second content output device 300 via the second communication network is completed (S1030) and the content is received via the second communication network (S1040), the received content may be buffered to the second reception buffer and be output (S1050). In this case, when the content received via the second communication network is buffered to the second reception buffer, the buffer connection may be switched to connect the second reception buffer with an output buffer. If the amount of the content buffered to the second reception buffer exceeds a predetermined threshold value, the buffer connection may be switched to connect the second reception buffer with the output buffer.

According to various example embodiments, when the group reproduction of content using a plurality of networks is performed, a content may be transmitted in advance via a pre-connected network before a plurality of network connections are completed, and the content may be output within the shortest time period. A network load and a network delay may also be minimized. Further, the robustness against a network error may be enhanced with the advantage of multiple paths, and accordingly, the quality of user experience may be improved.

Meanwhile, the methods according to the various example embodiments described above may be implemented as an application which can be installed in an existing user terminal device and a content output device.

Further, the methods according to the various example embodiments described above may be implemented by only software upgrade or hardware upgrade of at least one of an existing user terminal device and a content output device.

Also, the various example embodiments described above may be performed by an embedded server provided in a user terminal device and a content output device or by an external server of a user terminal device.

The various example embodiments described above may be implemented in a recording medium which a computer or a device similar to a computer can read using software, hardware or the combination thereof. In some cases, the example embodiments described in the present disclosure may be implemented as a processor itself. According to the software-wise implementation, the example embodiments such as the procedures and functions described in the present disclosure may be implemented as separate software modules. Each of the software modules may perform equal to or more than one function and operation described in the present disclosure.

Meanwhile, computer instructions for performing the processing operation of the content output device 100 according to various example embodiments may be stored in a non-transitory computer-readable medium. The computer instructions stored in the non-transitory computer-readable medium may control the processing operation performed in the content output device 100 according to various example embodiments described above to be performed by a certain device when the computer instructions are executed by a processor of the certain device.

A non-transitory computer readable medium may refer to a machine-readable medium or device that stores data. Examples of a non-transitory computer readable medium may include a compact disc (CD), a digital versatile disc (DVD), a hard disk, a Blu-ray disc, a universal serial bus (USB) stick, a memory card, a ROM, etc.

The foregoing various example embodiments are merely exemplary and are not to be understood as limiting the present disclosure. The description of the example embodiments is intended to be illustrative, and not to limit the scope of the disclosure, as defined by the appended claims, and many alternatives, modifications, and variations will be apparent to those skilled in the art.

What is claimed is:

1. A content output device comprising:
a communication interface comprising communication circuitry;
an output unit comprising output circuitry; and
a processor configured to:
control the output unit to output a content received from an external device through the communication interface;
control the communication interface to transmit, in response to an output request for the content being received from the external device via a first communication network including an access point external to the content output device, the content to an external content output device via the first communication network and thus via said access point; and
control the communication interface to, in response to completion of setting a connection with the external content output device via a second communication network while the content is being transmitted from the content output device to the external device via the first communication network and via said access point, switch transmission of the content to the external content output device from the first network to the second communication network,
wherein the first communication network includes said access point, and is connected between the content output device and the external device through said access point, and
wherein the second communication network is different than the first communication network and does not include said access point, and is connected between the content output device and the external device without going through said access point.

2. The content output device of claim 1, wherein the first communication network comprises a wireless LAN network based on the external access point, and the second communication network comprises a Wi-Fi peer to peer (P2P) network, and
wherein the processor is configured to:
transmit the content which is transmitted from the external device via the wireless LAN network to the external content output device via the wireless LAN network, and
transmit the content to the external content output device via the Wi-Fi P2P network in response to completion of setting a connection with the external content output device via the Wi-Fi P2P network while outputting the content by synchronizing with the external content output device.

3. The content output device of claim 1, wherein the processor is configured to transmit a part of the content subsequent to part of the content transmitted to the external content output device via the first communication network to the external content output device via the second communication network when the external content output device is connected via the second communication network.

4. The content output device of claim 1, wherein the processor is configured to:
encode the content to a quality less than a predetermined quality and transmit the content to the external content output device via the first communication network; and
transmit the content encoded to a quality higher than the predetermined quality to the external content output device via the second communication network in response to connecting with the external content output device via the second communication network.

5. The content output device of claim 1, wherein the content output device and the external content output device each comprise a speaker, and
wherein the content comprises an audio content transmitted from the external device.

6. The content output device of claim 1, wherein the processor is configured to transmit, in response to receiving the output request for grouping the content output device and the external content output device, the content to the external content output device via the first communication network.

7. A content output device comprising:
an output unit comprising output circuitry;
a communication interface comprising communication circuitry; and
a processor configured to:
buffer, in response to receiving a content from an external content output device via a first communication network including an access point external to the content output device, the content to a first reception buffer and output the buffered content through the output unit, and
buffer, in response to receiving the content via a second communication network after completion of setting a connection with the external content output device via the second communication network while the content was being received from the external content output device via the first communication network and thus via said access point, the content to a second reception buffer and output the buffered content through the output unit,
wherein the first communication network includes said access point, and is connected between the content output device and the external content output device through said access point, and
wherein the second communication network is different than the first communication network and does not include said access point.

8. The content output device of claim 7, wherein the processor is configured to:

connect the first reception buffer with an output buffer to output the content buffered to the first reception buffer, and switch a buffer connection to connect the second reception buffer with the output buffer in response to the content received via the second communication network being buffered to the second reception buffer.

9. The content output device of claim 7, wherein the processor is configured to switch a buffer connection to connect the second reception buffer with the output buffer if an amount of the content buffered to the second reception buffer exceeds a predetermined threshold amount.

10. The content output device of claim 7, wherein the content output device and the external content output device each comprise a speaker, wherein the content comprises an audio content.

11. A content output system including a first content output device and a second content output device, the content output system comprising:

the first content output device configured to:
transmit, in response to a content and an output request for the content being received, the content to the second content output device via a first communication network including an access point external to the first content output device,
output the content by synchronizing with the second content output device, and
set a connection with the second content output device via a second communication network while the content is being transmitted to the second content output device via the first communication network; and the second content output device configured to:
output, in response to completion of setting a connection with the first content output device via the second communication network while the content is being transmitted from the first content output device to the second content output device via the first communication network, the content received from the first content output device via the second communication network while outputting the content received from the first content output device via the first communication network by synchronizing with the first content output device, wherein the first communication network is connected through the access point, and
wherein the second communication network is different than the first communication network and is connected without going through the access point.

12. A method for controlling a content output device, the method comprising:

outputting a content and transmitting the content to an external content output device via a first communication network in response to receiving the content and an output request for the content from an external device via the first communication network; and switching transmitting of the content to the external content output device via a second communication network from the first communication network, in response to completion of setting a connection with the external content output device via the second communication network while the content is being transmitted to the external device via the first communication network, wherein the first communication network is connected through an external network apparatus, and
wherein the second communication network is different than the first communication network and is connected without going through the external network apparatus, wherein the external network apparatus comprises an access point external to content output device and the external content output device.

13. The method of claim 12, wherein the first communication network comprises a wireless LAN network based on the external network apparatus, and the second communication network comprises a Wi-Fi peer to peer (P2P) network, and wherein the transmitting the content to the external content output device comprises outputting the content which is transmitted from the external device via the wireless LAN network and transmitting the content to the external content output device via the wireless LAN network, and transmitting the content to the external content output device via the Wi-Fi peer to peer (P2P) network in response to completion of setting a connection with the external content output device via the Wi-Fi peer to peer (P2P) network.

14. The method of claim 12, wherein the transmitting the content to the external content output device comprises transmitting a part of the content subsequent to part of the content transmitted to the external content output device via the first communication network to the external content output device via the second communication network when the external content output device is connected via the second communication network.

15. The method of claim 12, wherein the transmitting the content to the external content output device comprises encoding the content to a quality less than a predetermined quality and transmitting the content to the external content output device via the first communication network, and transmitting the content encoded to a quality higher than the predetermined quality to the external content output device via the second communication network in response to connecting with the external content output device via the second communication network.

16. The method of claim 12, wherein the content output device and the external content output device each comprise a speaker, and wherein the content comprises an audio content transmitted from the external device.

17. A method for controlling a content output device, the method comprising:

buffering a content to a first reception buffer and outputting the content in response to receiving the content from an external content output device via a first communication network; and buffering the content to a second reception buffer and outputting the content in response to receiving the content via the second communication network, in response to completion of setting a connection with the external content output device via the second communication network while the content was being received from the external content output device via the first communication network, wherein the first communication network is connected through an external network apparatus, and
wherein the second communication network is different than the first communication network and is connected without going through the external network apparatus, wherein the external network apparatus comprises an access point external to content output device and the external content output device.

18. The method of claim 17, wherein the buffering the content to the first reception buffer and outputting the content comprises connecting the first reception buffer with an output buffer to output the content buffered to the first reception buffer, and wherein the buffering the content to the second reception buffer and outputting the content comprises switching a buffer connection to connect the second reception buffer with the output buffer in response to the content received via the second communication network being buffered to the second reception buffer.

19. The method of claim 17, wherein the buffering the content to the second reception buffer and outputting the content comprises switching a buffer connection to connect the second reception buffer with the output buffer if an amount of the content buffered to the second reception buffer exceeds a predetermined threshold amount.

20. The method of claim 17, wherein the content output device and the external content output device each comprise a speaker, and wherein the content comprises an audio content.

* * * * *